US011299167B2

(12) United States Patent
Lawson

(10) Patent No.: US 11,299,167 B2
(45) Date of Patent: Apr. 12, 2022

(54) SYSTEM AND METHOD FOR IMPROVING REAL-TIME ESTIMATES OF VISITOR VOLUME TO PLACES

(71) Applicant: Arrivalist Co., New York, NY (US)

(72) Inventor: Cree Lawson, New York, NY (US)

( * ) Notice: Subject to any disclaimer, the term of this patent is extended or adjusted under 35 U.S.C. 154(b) by 0 days.

(21) Appl. No.: 17/016,068

(22) Filed: Sep. 9, 2020

(65) Prior Publication Data

US 2022/0073082 A1 Mar. 10, 2022

(51) Int. Cl.
*B60W 40/09* (2012.01)
*G08G 1/01* (2006.01)
*G06V 40/20* (2022.01)

(52) U.S. Cl.
CPC ............ *B60W 40/09* (2013.01); *G06V 40/20* (2022.01); *G08G 1/0108* (2013.01); *G08G 1/0125* (2013.01)

(58) Field of Classification Search
CPC . B60W 40/09; G06K 9/00335; G08G 1/0108; G08G 1/0125
See application file for complete search history.

(56) References Cited

U.S. PATENT DOCUMENTS

2020/0164891 A1* 5/2020 Bender ............ B60W 50/0097
2021/0150828 A1* 5/2021 Mezaael ................ H04W 4/44

* cited by examiner

*Primary Examiner* — Mathew Franklin Gordon
(74) *Attorney, Agent, or Firm* — John L. Sotomayor

(57) ABSTRACT

The present invention is a system and method for improving the accuracy with which human behavioral insights regarding visitor volume to places can be predicted. The process aligns at least two different data sets and normalizes the information by removing statistical bias. In a particular implementation motor vehicle data is collected from a known subset of road-borne vehicles and compared to data collected from unknown vehicles. The data is then increased or discounted to remove biases present in the known subset. The system analyzes the normalized data and returns a report including predictions to a human user.

12 Claims, 3 Drawing Sheets

SYSTEM AND METHOD FOR IMPROVING REAL-TIME ESTIMATES OF VISITOR VOLUME TO PLACES

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Municipal departments of transportation answerable to city, state and federal officials are commonly tasked with measuring metrics associated with tourism and travel. Such metrics are used by city, state and federal planners to allocate scarce resources and prioritize assets for repair or in anticipation of travel growth. Owners and managers of tourist attractions, hotels, airports, shopping centers and performance venues similarly relay on such developed metrics to plan for and manage economic growth or decline.

Automobile-conveyed visitor volume is commonly determined through the use of human surveys or by use of traffic data recorders. Traffic data recorders provide real-time data on car-based visitor volumes. In some instances, visitor volume is calculated using combinations of visitor phone data and car data and/or combinations of traffic monitor data and survey data.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
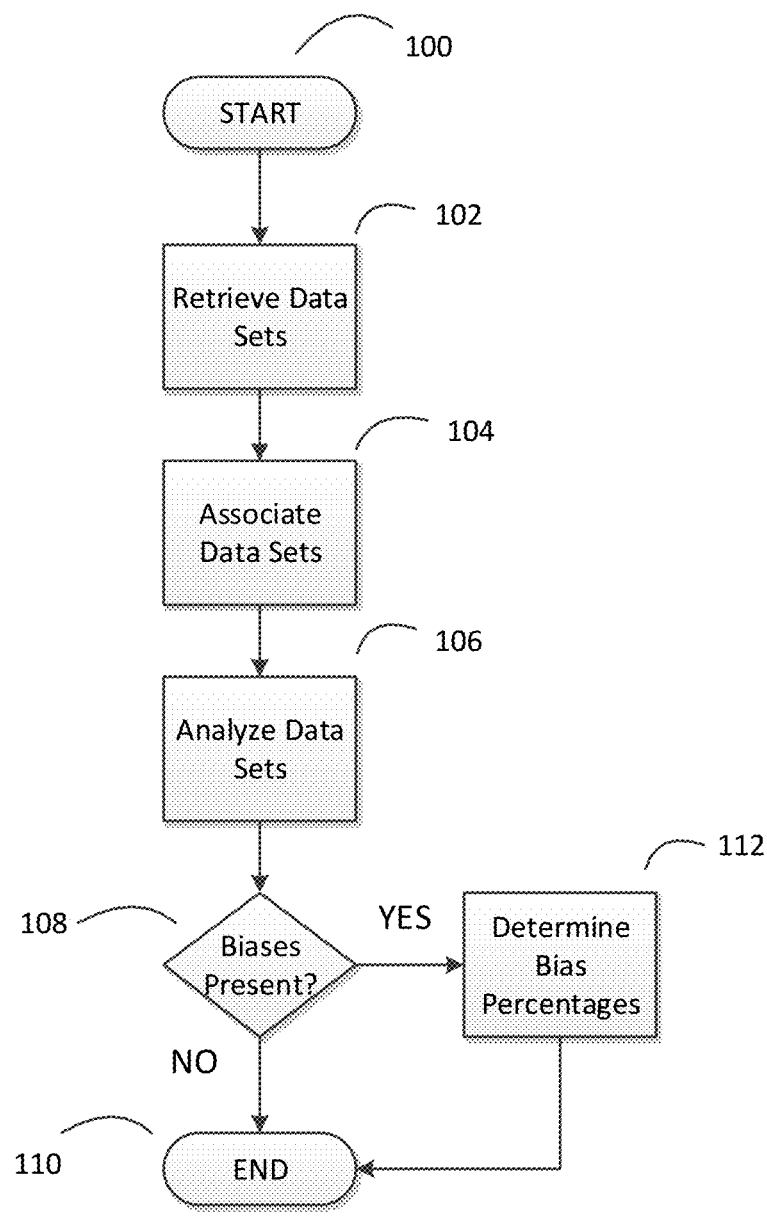
FIG. 1 is a view of a sub-process for determining data biases in captured data sets consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "Global Positioning System (GPS)" refers to the satellite-based radio-navigation system operated by the United States Space Force.

Reference throughout this document to "device" refers to any electronic communication device with network access such as, but not limited to, a cell phone, smart phone, tablet, iPad, networked computer, internet computer, laptop, watch or any other device, including Internet of Things devices, a user may use to interact with one or more networks.

However, unless specifically stated otherwise as apparent from the following discussion, it is appreciated that throughout the description, discussions utilizing terms such as "processing" or "computing" or "calculating" or "determining" or "displaying" or "analyzing" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The processes and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Although a variety of municipalities and third-party data analysts have pioneered the development of vehicle-conveyed visitor insights based on smartphone location data, auto location data, traffic data recorders and human surveys, no one of these models can yield truly accurate visitor volume (or share of visits) data on its own. In addition, no matter which model is employed, no one model captures the number of travelers in any given vehicle, or the number of visitors who arrive in any particular jurisdiction by plane or train or boat, or the visitors' origins and/or destinations. Thus, there is a need for a system and method for combining the virtues of each available data set, including data sets representing satellite imagery, to accurately estimate visitor volume to a place in real-time. In a preferred embodiment, each such data set is tagged with time-stamp indicia indicating the point in time at which the data was captured. In the event in which data is sourced from third parties, the time-stamped indicia appended thereto may or may not have been responsive to some discrete triggering event.

In an embodiment, the instant innovation utilizes a "panel," herein defined as a series of vehicles about which information has been collected and is known to the system. Such series of vehicles represents a measurable subset of the entire number of vehicles in use upon defined roadways. The panel does not represent every car in the system, but rather a subset for which measurements and other information, such as (by way of non-limiting example) registration information, is known to the system. In an embodiment, at least some subset of the operators of vehicles in the panel has opted to take part in a survey. The survey seeks information that includes, by way of non-limiting example, vehicle make, model, and age information, vehicle operator demographic information, vehicle operator preferences, and/or vehicle origin and/or destination.

In a principal embodiment, the system associates vehicles in the panel to vehicles not in the panel by matching the time stamps of empaneled and non-empaneled vehicle crossings that the system observes from vehicle Global Positioning System (GPS) data or vehicle-conveyed phone GPS data to the timestamp that the system observes from one or more Traffic Data Monitors. The Traffic Data Monitor is a sensor-equipped trigger device that that creates a timestamp when a vehicle passes the sensor. Other sensors of this type may be found at the ingress and egress points of discrete areas including but not limited to parking lots and garages. In its fundamental embodiment, the system utilizes ingress and egress sensors, of which a Road Rope is a particular mobile trigger sensor, to initialize the action of further data synthesis. Ingress and/or egress sensor types may also include, by way of non-limiting example, cameras, traffic metering crossing bars (and/or crossing bars, generally) and traffic toll booths.

In an embodiment, the timestamp and GPS information from the sensor (of whatever type) is used to match against a vehicle that is contained in the panel to provide information about where the vehicle was when the sensor was triggered. The system's association of empaneled vehicles with not non-empaneled vehicles permits the system to determine behavioral characteristics about the travelers in the non-empaneled vehicles. Sensor triggering events can be used as verification as to vehicle location and be used to determine broader statistical characteristics.

In an embodiment, data is collected from Road Ropes that record the exact time that a vehicle crosses a certain point in the road upon which a Road Rope has been positioned. By way of non-limiting example, in an instance in which 50 cars per minute cross a given point on an interstate, the instant innovation may receive a location data point from each of the cars in the panel every three seconds. If five empaneled cars cross a particular place in the road within the same minute (such particular place delimited, in a non-limiting example, by a Road Rope), then statistically it is determinable that the panel at issue represents 10% of the total travel over that point.

In an embodiment, ingress and/or egress sensors may be used to determine the total number of vehicles entering into a parking lot, parking garage, or other discrete geographical area. The system may detect the number of panel vehicles within the total number of vehicles sensed, and use the ratio of panel vehicles to the total number of vehicles to determine the present sample size. By way of non-limiting example, if a crossing-bar sensor rises one-hundred times in response to the ingress to a parking lot of one-hundred unique vehicles, and the system detects the presence of ten panel vehicles among the one-hundred unique vehicles, the system can then calculate a sample size of ten percent. Similarly, if the system sensors detect one hundred vehicles crossing the area bounded by a toll booth within one minute, and the system determines that ten of those vehicles are panel vehicles, then the system can calculate a sample size of ten percent.

In an embodiment, the instant innovation utilizes a geo-fence or "polygon" around that place in the road where the Road Rope is placed. The system counts the visits from cars (or from mobile devices that serve as proxies for the cars in which they are conveyed) to that place in a given minute and then compares that number to the total number of cars crossing the Road Rope in that same minute. Additional calculations follow from this same approach.

By way of non-limiting example, if the system determines that on Fridays from 3-5 PM, 10% of the cars in a panel crossing a certain point then proceed to a performance venue at the next exit, the system can predict visitation volume at that venue. The system may calculate such predicted visitation volume by multiplying the number of panel cars crossing a given Road Rope between 3-5 PM by a multiplier of 10.

In an embodiment, the system can deliver visitation volume insights in real-time, providing accurate estimates of visitor volume with information about visitor origin and destination. The system increases estimate accuracy in part by overlaying data from phones or other mobile devices and data from traffic data monitors to calculate the total number of people arriving to a destination, as opposed to calculating merely the number of vehicles arriving to that destination. Time-stamped third-party sourced information may or may have been captured in response to a triggering event.

In an embodiment, the system can provide insights about any mode of transport, measure other points of interest visited by subject vehicles on the same trip to establish patterns of visitation, and reveal changes in speed of travel in real-time.

In an embodiment, the present innovation is an analytic software process for increasing the accuracy of insights into human behavioral decisions by combining real-time data from traffic data recorders and automobile location data from sources including, but not limited to, mobile device GPS systems, terrestrial imagery systems, satellite imagery systems, and third-party data sources.

In an embodiment, the present innovation aligns at least two different data sets, and normalizes the information contained in the data sets by removing bias from over-indexation within the data sets. The instant innovation can also parse data to differentiate data contributions made by panel vehicles versus data contributions made by not-panel vehicles. In an embodiment, the foregoing process is conducted in real-time, with data analysis, including an estimation of vehicle origin markets, being completed virtually simultaneously with data collection. The analysis of all data contributions from all sources, comparing and contrasting the entire population of data points collected to those data points that are specific to panel vehicles, is performed dynamically with updates to insights derived from such analysis reported to a user, transportation authority, or other client in real-time as the results are generated, or reported later as desired by the client. In so doing, the instant innovation improves the accuracy with which analysts may draw conclusions about the way people and motor vehicles are travelling.

In an embodiment, the instant innovation can provide balanced insights based on vehicle location data which can then be used by and within certain digital applications. By way of non-limiting example, a digital application may calculate travel time within a certain region on a day-by-day and/or state-by-state basis.

Turning now to FIG. 1, a view of a sub-process for determining data biases in captured datasets consistent with certain embodiments of the present invention is shown. At 100 the sub-process starts. At 102 the system retrieves two or more data sets. In an embodiment, one of the retrieved data sets (hereinafter, "Set 1") is sourced from known vehicles, the known vehicles comprising a subset of all vehicles. At 104 the system associates the two or more data sets based upon timestamps recorded with the data sets and compares one or more data sets sourced from unknown vehicles to Set 1. At 106 the system analyzes the Data Sets for the presence of Biases in Set 1. This analysis results in Analyzed Data Sets. If at 108 no biases are present, then the sub-process ends at 110. If at 108 the system determines the presence of biases, then at 112 the system determines bias percentage. At 110 the sub-process ends.

Figure 2:
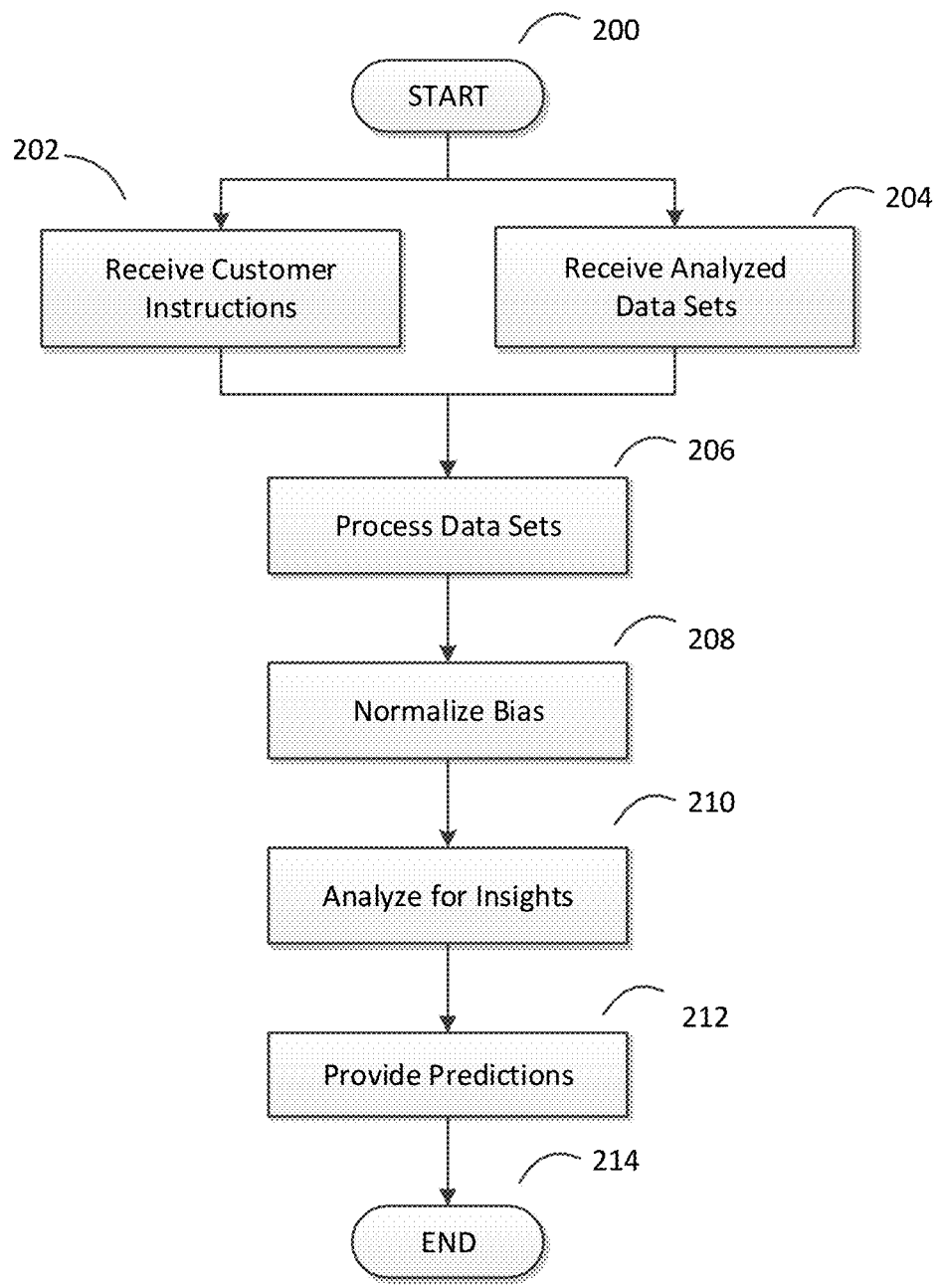
FIG. 2 is a view of a sub-process for removing data biases and processing a resulting data set consistent with certain embodiments of the present invention.

Turning now to FIG. 2, a view of a sub-process for removing data biases and processing a resulting data set consistent with certain embodiments of the present invention.is shown. At 200 the sub-process starts. The system receives Customer Instructions at 202 and at 204 the system receives the Analyzed Data Sets described in FIG. 1. At 206 the system processes the Analyzed Data Sets in light of the Customer Instructions. By way of non-limiting example, Customer Instruction may direct analysis of traveler behavior upon a specific highway during a specific time of the day. At 208 the system normalizes for the percentage bias determined as described in FIG. 1. Such normalization may also be accompanied by Data Smoothing. At 210 the system analyzes the normalized output for forward-looking insights into human behavior. At 212 the system provides predictions regarding future human behavior in the form of a report. At 214 the sub-process ends.

Figure 3:
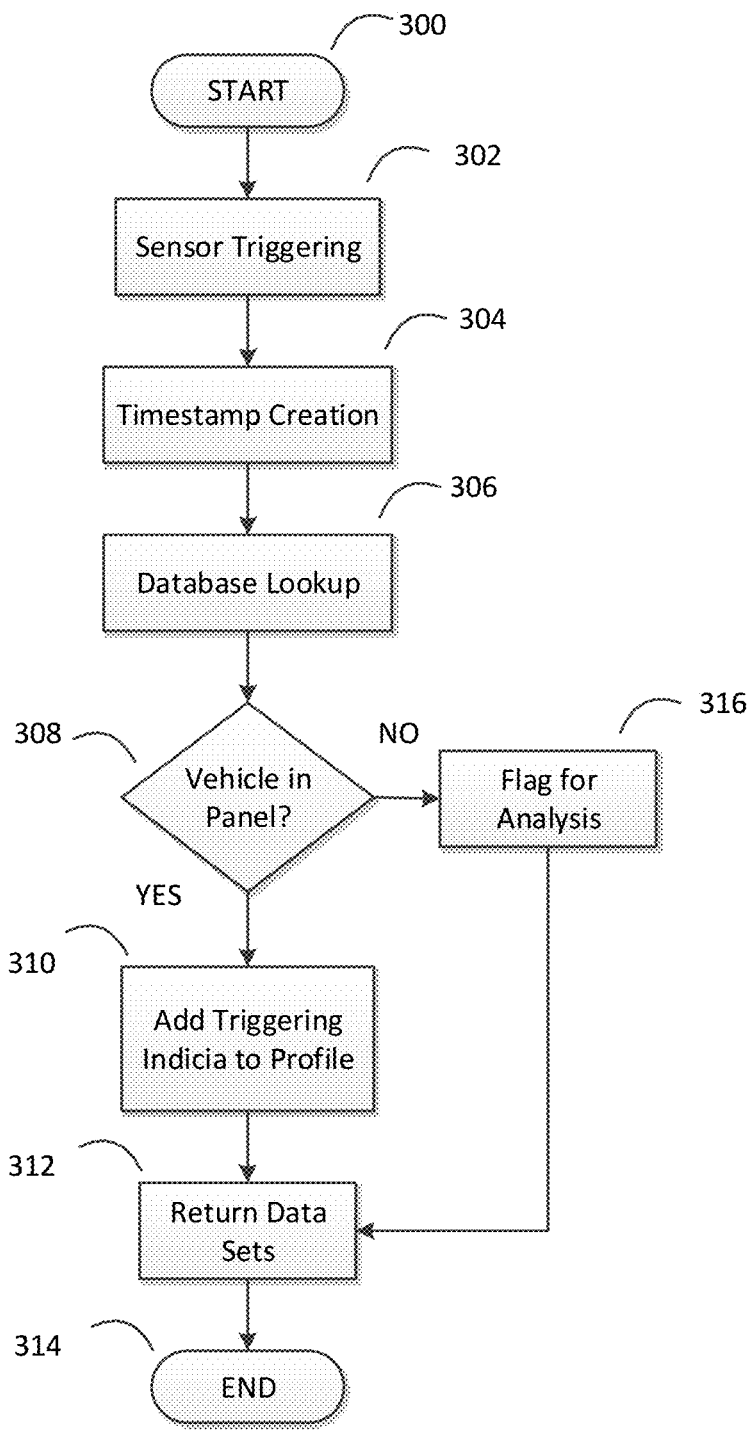
FIG. 3 is a view of a sub-process for returning initial data sets consistent with certain embodiments of the present invention.

Turning now to FIG. 3, a view of a sub-process for returning initial data sets consistent with certain embodiments of the present invention is shown. At 300 the sub-process starts. At 302 the system is triggered by ingress and/or egress sensors and/or other traffic data monitors to recognize that a vehicle has crossed a geographical boundary of interest to a customer. At 304 the system creates a timestamp that marks the triggering event and associates the timestamp with the triggering vehicle. At 306 the system refers to a database of vehicles to determine whether the vehicle responsible for the triggering event is represented by a panel profile in the system database. If at 308 the vehicle is in the panel, then at 310 triggering indicia are added to the vehicle profile. If at 308 the vehicle is not in the panel, then at 316 the vehicle is flagged for analysis. At 312 the system returns data sets on empaneled and un-empaneled vehicles for further analysis. At 314 the sub-process ends.

While certain illustrative embodiments have been described, it is evident that many alternatives, modifications, permutations and variations will become apparent to those skilled in the art in light of the foregoing description.

What is claimed is:

1. A method for improving estimates of visitor volume to places, comprising:
    collecting a first data set in response to a first sensor triggering event comprising vehicle location data from one or more devices associated with occupants of a known motor vehicle, the first data set representing known characteristics of said occupants in a motor vehicle panel data set;
    collecting one or more second data sets in response to a second sensor triggering event comprising activating a geographically placed traffic sensor, the one or more second data sets representing characteristics of occupants of known and unknown motor vehicles;
    aggregating said first data set and at least one of the one or more second data sets into a data set comprising known and unknown vehicles;
    identifying a known, empaneled vehicle in the first data set and at least one of the one or more second data sets by comparing synchronized timestamps recorded with each first data set and one or more second data sets and labeling all other vehicles in said aggregated data set as not empaneled;
    calculating the presence of one or more statistical biases associated with said empaneled vehicles;
    normalizing the one or more statistical biases and producing a resulting data set comprising one or more results that apply to all vehicles within said aggregated data set;
    analyzing the resulting aggregated data set for human behavioral insights for all vehicles within said aggregated data set and providing a report upon said human behavioral insights to a user.

2. The method of claim 1, where correcting the one or more statistical biases is affected by applying a multiplier.

3. The method of claim 1, where the human behavioral insights reflect prospective human travel behavior.

4. The method of claim 1, where the one or more second data sets capture real-time vehicle data.

5. The method of claim 4, where the real-time vehicle data is captured using a digital device application, and/or a traffic data monitor, and/or a satellite monitor, or where the real-time vehicle data is captured using a combination of any of the digital device application, and/or the traffic data monitor, and/or the satellite monitor.

6. The method of claim 1, where the vehicle data is supplemented by third-party sources.

7. A system for improving estimates of visitor volume to places, comprising:

a server with a processor in communication with one or more digital devices;

said server collecting a first data set in response to a first sensor triggering event comprising vehicle location data from one or more devices associated with occupants of a known motor vehicle, the first data set representing known characteristics of said occupants in a motor vehicle panel data set;

said server collecting one or more second data sets in response to a second sensor triggering event comprising activating a geographically placed traffic sensor, the one or more second data sets representing characteristics of occupants of known and unknown motor vehicles;

said server aggregating said first data set and at least one of the one or more second data sets into an aggregated data set comprising known and unknown motor vehicles;

said server identifying a known, empaneled vehicle in the first data set and at least one of the one or more second data sets by comparing synchronized timestamps recorded with each first data set and one or more second data sets and labeling all other vehicles in said aggregated data set as not empaneled;

said server operative to calculate the presence of one or more statistical biases associated with said empaneled vehicles;

said server normalizing the one or more statistical biases and producing a resulting data set comprising one or more results that apply to all vehicles within said aggregated data set and storing said results within an electronic storage element within said server;

said server analyzing the resulting data set for human behavioral insights for all vehicles within said aggregated data set and providing a report upon said human behavioral insights to a user.

8. The system of claim 7, where correcting the one or more statistical biases is affected by applying a multiplier.

9. The system of claim 7, where the human behavioral insights reflect prospective human travel behavior.

10. The system of claim 7, where the one or more motor vehicle second data sets capture real-time vehicle data.

11. The system of claim 10, where the real-time vehicle data is captured using a digital device application, and/or a traffic data monitor, and/or a satellite monitor, or where the real-time vehicle data is captured using a combination of any of the digital device application, and/or the traffic data monitor, and/or the satellite monitor.

12. The method of claim 7, where the vehicle data is supplemented by third-party sources.

* * * * *